3,073,743
ANTIINFLAMMATORY STEROID ACETONIDE COMPOSITIONS AND THERAPY

George B. Spero, Kalamazoo Township, Kalamazoo County, Mich., assignor to The Upjohn Company, Kalamazoo, Mich., a corporation of Delaware
No Drawing. Filed July 30, 1959, Ser. No. 830,457
12 Claims. (Cl. 167—65)

This invention relates to pharmaceutical compositions for topical use and, more particularly, to topical compositions containing 1-dehydro-6α-methyl-9α-fluoro-16α-hydroxyhydrocortisone 16,17-acetonide or 21-esters thereof as the principal active ingredient.

The inflammatory diseases in their various manifestations collectively represent one of the more serious problems confronting medical science. Although many antiinflammatory agents have been made available to the clinician, few possess in high degree the unpredictable qualities of absorption and effectiveness desired in a topical steroid medicament. The compositions of the present invention are among those few products which have been found to be sufficiently efficacious when applied topically to justify actual clinical use in allergic dermatoses or other inflammatory conditions amenable to topical therapy as defined herein. These compositions are useful, for example, in the treatment of such conditions as contact dermatitis, atopic dermatitis, neurodermatitis, anogenital pruritus, seborrheic dermatitis, and the like.

The novel compositions in general comprise from about 0.001% to about 0.5% of 1-dehydro-6α-methyl-9α-fluoro-16α-hydroxyhydrocortisone 16,17-acetonide or its physiologically acceptable 21-esters dispersed in a physiologically acceptable pharmaceutical base. Although higher concentrations can be employed in isolated instances, the exceptionally high anti-inflammatory activity of 1-dehydro-6α - methyl - 9α-fluoro-16α-hydroxyhydrocortisone 16,17-acetonide and its 21-esters enables the use of relatively low concentrations in the compositions of this invention. The preferred range for the majority of clinical indications is from about 0.005% to about 0.1%. In use, these compositions are employed in a manner appropriate to the specific topical pharmaceutical form, as hereinafter described, which is indicated for the clinical condition and locale being treated. Generally, application one to three times daily is recommended, with frequency being reduced as improvement is noted.

The primary active ingredients contemplated in the compositions of this invention are the said 1-dehydro-6α-methyl-9α-fluoro-16α-hydroxyhydrocortisone 16,17-acetonide and its physiologically acceptable 21-esters. The esters suitable for topical use in the present compositions embrace a wide range of compounds which in general confer enhanced qualities on the 1-dehydro-6α-methyl-9α - fluoro - 16α - hydroxyhydrocortisone 16,17-acetonide molecule by virtue of a prolonged or intensified pharmacological activity or due to the physical properties which the ester groups confer. Of particular interest is 1-dehydro-6α-methyl-9α-fluoro-16α-hydroxyhydrocortisone 16,17-acetonide 21-acetate. Other 21-esters deserving of special mention and specifically embraced within the compositions of this invention include the furoate, tertiary butylacetate, carbethoxylate, diphenylacetate, 2-chloro-4-nitrobenzoate, 2-ethyl-isovalerate, α-ethyl-n-butyrate, cyclopentylcarboxylate, and the like, as well as the alkali metal salts, such as the sodium salt, of the hemisuccinate, hemiglutarate, hemi-β,β-dimethylglutarate, hemimaleate, and the amine salts (such as diethanolamine, epinephrine etc.), the phosphate, and the xanthogenate.

Various active ingredients in addition to 1-dehydro-6α-methyl - 9α-fluoro-16α-hydroxyhydrocortisone 16,17-acetonide and its 21-esters can be included in the formulations of the present invention to provide a desirable complementary effect which, when employed in the treatment of particular conditions, enhances the usefulness of the said primary active ingredients. Thus, various antibiotics such as neomycin, the tetracyclines, novobiocin, erythromycin, bacitracin, polymyxin, and penicillin alone or in combination; antifungal agents such as iodochlorohydroxyquin and nystatin; vasoconstrictors such as phenylephrine and isoproterenol, and local anesthetic agents such as procaine hydrochloride, ethylaminobenzoate, phenocaine hydrochloride, tetracaine hydrochloride, lidocaine hydrochloride, primoxine hydrochloride, and the like can be included in the formulation.

In addition to the treatment of humans, the novel compositions find application in the topical treatment of inflammatory conditions in animals, especially animal mastitis, a disease of the mammary glands which can be of particular concern in milk-producing animals such as cows. Preferably, compositions designed for udder instillation comprise from about 0.05 to about 0.5% 1-dehydro-6α - methyl - 9α-fluoro-16α-hydroxyhydrocortisone 16,17-acetonide or its 21-esters together with an antibacterial component and a non-anionic surfactant dispersed in a liquid oleaginous vehicle. Suitable preparations embodying the active ingredients herein can be prepared by substituting such ingredients for those disclosed in the formulations of copending application Serial No. 784,418, filed January 2, 1959, now abandoned.

Broadly described, the method for the preparation of pharmaceutically acceptable formulations involves the incorporation of the principal active ingredients, together with any complementary or supplementary active ingredients, into the selected pharmaceutically acceptable carrier, utilizing techniques well known in the art. By "pharmaceutically acceptable carrier" or "base" as used herein is meant the vehicle into which the active ingredients are incorporated, the said vehicle comprising various pharmaceutically and physiologically suitable additives the purpose of which is to facilitate the formulation of the said active ingredients into the desired pharmaceutical form.

The term "topical" as employed in this application includes all pharmaceutical forms in which the active ingredient, incorporated in a suitable base or vehicle, is deposited on the affected site for exertion of local action. Accordingly, the term includes those forms in which the medication is applied externally by direct contact with the surface to be medicated as well as those pharmaceutical forms, such as sprays (e.g., for oral or nasal use), aerosols (e.g., for deeper penetration than is usually afforded by a spray), drops (e.g., for use in the eyes and ears), suppositories (e.g., for rectal or vaginal use), powders (e.g., for insufflation), and the like. For compositions applied directly to the skin (or, in veterinary use, by udder instillation), the conventional pharmaceutical forms, such as ointments (including creams), lotions, pastes, jellies, powders and the like are well adapted for incorporation of the active ingredients disclosed herein. The term "ointment" embraces formulations having oleaginous, absorption, water-soluble and emulsion-type bases as defined and described in Remington's Practice of Pharmacy, 11th edition (1956), page 336, Mack Publishing Company.

The method for using the compositions of this invention in the treatment of inflammatory conditions amenable to topical therapy comprises the application to the affected locale of compositions containing from about 0.001% to about 0.5% 1-dehydro-6α-methyl-9α-fluoro-16α-hydroxyhydrocortisone 16,17-acetonide or its physiologically acceptable 21-esters, the active ingredients being dispersed in a pharmaceutically acceptable carrier. A concentration range of about 0.005% to about 0.1% is normally preferred. The exact mode of administration and the selected pharmaceutical form depends on, among other factors, the availability of the affected site for direct application. Where the affected area is exposed, conventional ointment, lotion or cream forms and the like are employed. Where the area to be treated is not exposed and can be reached more conveniently with such forms as drops, aerosols, inhalation powders, suppositories or the like, the active ingredients are incorporated in the appropriate carrier or base and administered accordingly.

The active ingredients of the novel compositions can be prepared, for example, as follows:

*Preparation 1.*—3,20-disemicarbazone of 6α-methylhydrocortisone acetate: A solution is prepared containing 1.65 gm. of semicarbazide hydrochloride in 10 ml. of water. This solution is added to a solution of 1 gm. of 6α-methylhydrocortisone acetate [Spero et al., J. Am. Chem. Soc. 78, 6213 (1956)] in 1.2 ml. of pyridine and 40 ml. of methanol. The mixture is refluxed for a period of 18 hours and then concentrated to 20 ml. and poured into 500 ml. of ice water. The reaction mixture is kept at 0° C. for 6 hours and thereafter filtered. The precipitate is washed with ice water and dried. The colorless crystals of the 3,20-disemicarbazone of 6α-methylhydrocortisone 21-acetate thus prepared weighed 1,216 gm., had a melting point of over 300° C. and a rotation $[\alpha]_D$ of plus 173° in dioxane.

*Analysis.*—Calculated for $C_{26}H_{40}O_6N_6$: C, 58.63; H, 7.57. Found: C, 58.40; H, 7.46.

*Preparation 2.*—6α-methyl-11β,21-dihydroxy-4,16-pregnadiene-3,20-dione 21-acetate: A solution is prepared containing 20 ml. of glacial acetic acid, 1 ml. of acetic anhydride, and 1 gm. of the 3,20-disemicarbazone of 6α-methylhydrocortisone acetate. This mixture is refluxed in a nitrogen atmosphere for a period of one hour. The reaction mixture is then concentrated in vacuo to approximately 12 ml. and treated with 6 ml. of pyruvic acid. The reaction mixture is kept at room temperature for a period of 40 hours. Thereafter the mixture is heated for 2 hours at 60° C., allowed to cool and diluted with 600 ml. of water. The aqueous mixture is extracted three times with 400-ml. portions of chloroform, the chloroform extracts washed twice with 100-ml. portions of 5% sodium carbonate solution and three times with 100 ml. portions of water. The thus washed and combined chloroform extracts are dried over anhydrous sodium sulfate and evaporated to dryness. The crude residue containing the 6α-methyl-11β,21-dihydroxy-4,16-pregnadiene-3,20-dione 21-acetate is then chromatographed over 70 gm. of aluminum oxide, using 60 ml., each with the following results:

| Fraction No. | Solvent | Weight of residue in milligrams |
| --- | --- | --- |
| 1–4 | benzene | |
| 5–7 | benzene: ether 9:1 | |
| 8–10 | benzene: ether 8:2 | |
| 11 | benzene: ether 1:1 | |
| 12 | do | 3 |
| 13 | do | 12 |
| 14 | ether | 51 |
| 15 | do | 40 |
| 16 | do | 15 |
| 17 | do | 6 |
| 18 | do | 4 |
| 19 | ether: methylene chloride 9:1 | 1 |
| 20 | do | 1 |
| 21 | ether: methylene chloride 8:2 | |
| 22 | do | |
| 23–24 | ether: methylene chloride 1:1 | |
| 25–28 | methylene chloride | |
| 29–30 | methanol | |

Fractions 12 through 20, inclusive, are combined, crystallized and recrystallized from benzene-Skellysolve B (hexane hydrocarbons) to give a total of 122 mg. of 6α-methyl-11β,21-dihydroxy-4,16-pregnadiene-3,20-dione 21-acetate, having one melting point at approximately 115° C. and a second melting point at 152 to 154° C. and rotation $[\alpha]_D$ of 177° in chloroform.

*Analysis.*—Calcd. for $C_{24}H_{32}O_5$: C, 71.97; H, 8.05. Found: C, 70.99; H, 8.07.

*Preparation 3.*—6α-methyl-11β,16α,17α,21-tetrahydroxy-4-pregnene-3,20-dione: A reaction mixture containing 90 mg. of 6α-methyl-11β,21-dihydroxy-4,16-pregnadiene-3,20-dione 21-acetate, 65 mg. of osmium tetroxide in 2.5 ml. of benzene and 0.12 ml. of pyridine is allowed to stand at room temperature for a period of 95 hours. Thereafter a solution of 0.7 gm. of anhydrous sodium sulfite and 0.7 gm. of potassium bicarbonate dissolved in 65 ml. of water is added to the mixture while stirring, which is continued for a period of 16 hours. The mixture is then diluted with 10 ml. of chloroform and filtered. The residue on the filter is washed with a total of 100 ml. of hot chloroform. The chloroform washings and the filtrate are combined, saturated with saline solution and the chloroform layers separated. The chloroform layer is then dried over anhydrous sodium sulfate and evaporated to dryness. The residue weighing approximately 100 mg. is twice recrystallized from acetone-ether to give 39 mg. of 6α-methyl-11β,16α,17α,21-tetrahydroxy-4-pregnene-3,20-dione, M.P. 215–217° C. and rotation $[\alpha]_D$ of plus 68° in dioxane.

*Analysis.*—Calcd. for $C_{22}H_{32}O_5$: C, 67.32; H, 8.22. Found: C, 66.76; H, 8.37.

*Preparation 3a.*—6α-methyl-11β,16α,17α,21-tetrahydroxy-4-pregnene-3,20-dione 21-acetate: A mixture containing 200 mg. of 6α-methyl-11β,21-dihydroxy-4-16-pregnadiene-3,20-dione 21-acetate, 145 mg. of osmium tetroxide in 6 ml. of benzene, and 0.30 ml. of pyridine is allowed to stand at room temperature for a period of 76 hours. Thereafter a solution of 1.5 gm. of anhydrous sodium sulfite and 1.5 gm. of potassium bicarbonate, dissolved in 140 ml. of water, is added to the reaction mixture while stirring which is continued for a period of one hour. The mixture is then diluted with 25 ml. of chloroform and filtered. The residue on the filter is washed with a total of 200 ml. of hot chloroform. The chloroform washings and the filtrate are combined, saturated with saline solution and the chloroform layers separated. The chloroform layer is then dried over anhydrous sodium sulfate and evaporated to dryness. The residue is twice recrystallized from acetone-ether to give 6α-methyl-11β,16α,17α,21-tetrahydroxy-4-pregnene-3,20-dione 21-acetate.

*Preparation 4.*—6α-methyl-11β,16α,17α,21-tetrahydroxy-4-pregnene-3,20-dione (6α-methyl-16α-hydroxy-hydrocortisone): A mixture containing 0.5 gm. of 6α-methyl-11β,16α,17α,21-tetrahydroxy-4-pregnene-3,20-dione 21-acetate dissolved in 20 ml. of a solution containing 0.3 gm. of sodium hydroxide, 18 ml. of methanol and 2 ml. of water is allowed to stand in a nitrogen atmosphere for a period of 6 hours. Thereafter the solution is diluted by adding 100 ml. of water and refrigerated to 0–5° C. The aqueous mixture is then filtered and the precipitate twice recrystallized from acetone-Skellysolve B hexanes to give essentially pure 6α-methyl-11β,16α,17α,21-tetrahydroxy-4-pregnene-3,20-dione.

*Preparation 5.*—6α-methyl-11β,16α,17α,21-tetrahydroxy-4-pregnene-3,20-dione 16,21-diacetate (6α-methyl-16α-hydroxyhydrocortisone 16,21-diacetate): A mixture of 0.2 gm. of 6α-methyl-11β,16α,17α,21-tetrahydroxy-4-pregnene-3,20-dione, 0.1 ml. of acetic anhydride in 1 ml. of pyridine is allowed to stand for a period of 4 hours. Thereafter, the mixture is poured into 15 ml. of water, and the aqueous mixture is cooled to 0–5° C. and filtered. The thus collected precipitate is washed with water and finally recrystallized from methanol to give 6α-methyl-11β,16α,17α,21-tetrahydroxy-4-pregnene-3,20-dione 16,21-diacetate.

*Preparation 6.*—6α-methyl-16α,17α,21-trihydroxy-4,9(11)-pregnadiene-3,20-dione 16,21-diacetate: A mixture of 1 gm. of 6α-methyl-11β,16α,17α,21-tetrahydroxy- 4-pregnene-3,20-dione 16,21-diacetate, 650 mg. of N-bromoacetamide and 6 ml. of pyridine are stirred in the dark for a period of 30 minutes. The mixture is cooled in an ice-water bath and a stream of sulfur dioxide directed onto the surface of the stirred mixture until a negative potassium iodide-starch test was obtained. Fifty milliliters of water is added to the mixture and the mixture is maintained at about 5° C. for 30 minutes. The precipitated white solid is filtered, washed with water and dried under vacuum. After crystallization from acetone there is obtained essentially pure 6α-methyl-16α,17α,21-trihydroxy-4,9(11)-pregnadiene-3,20-dione 16,21-diacetate.

*Preparation 7.* — 6α-methyl-9α-bromo-11β,16α,17α,21-tetrahydroxy-4-pregnene-3,20-dione 16,21-diacetate: A solution is prepared containing 0.5 gm. of 6α-methyl-16α,17α,21 - trihydroxy - 4,9(11)-pregnadiene-3,20-dione 16,21-diacetate in 20 ml. of methylene chloride, and a solution of 1 ml. of 71% perchloric acid in 10 ml. of water and 200 mg. of N-bromoacetamide in 50 ml. of tertiary butyl alcohol is added thereto. The resulting solution is maintained at room temperature for 15 minutes and then mixed with a solution of 0.3 gm. of sodium sulfite in 12 ml. of water. The mixture is distilled at reduced pressure until the residual solution becomes cloudy. The product is then precipitated by the addition of 100 ml. of a mixture of ice and water. The white crystalline precipitate is filtered, washed with water, dried and recrystallized from a mixture of acetone and Skellysolve B hexanes to give 6α - methyl - 9α - bromo - 11β,16α,17α,21-tetrahydroxy-4-pregnene-3,20 dione 16,21-diacetate.

*Preparation 8.* — 6α-methyl-9β,11β-oxido-16α,17α,21-trihydroxy-4-pregnene-3,20-dione 16,21-diacetate: A mixture of 0.45 gm. of 6α-methyl-9α-bromo-11β,16α,17α,21-tetrahydroxy-4-pregnene-3,20-dione 16,21-diacetate, 0.45 gm. of anhydrous potassium acetate and 20 ml. of acetone is heated at its refluxing temperature for a period of 5 hours. The mixture is then cooled, poured into water and extracted with methylene chloride. The methylene chloride extract was dried and poured over a column of 25 gm. of Florisil (synthetic magnesium silicate). The column is developed with Skellysolve B hexanes containing increasing portions of acetone. The Skellysolve B plus 10% acetone eluate contains 6α-methyl-9β,11β,oxido-16α,17α,21-trihydroxy-4-pregnene-3,20-dione 16,21-diacetate.

*Preparation 9.* — 6α-methyl-9α-fluoro-11β,16α,17α,21-tetrahydroxy-4-pregnene-3,20-dione 16,21-diacetate: A solution of 1 gm. of 6α-methyl-9β,11β-oxido-16α,17α,21-trihydroxy-4-pregnene-3,20-dione 16,21-diacetate is dissolved in 50 ml. of methylene chloride and 5 ml. of 48% hydrofluoric acid and 0.5 ml. of 71% perchloric acid are added thereto. The mixture is stirred vigorously for 6 hours and then poured into an excess of cold aqueous 5% sodium bicarbonate solution. The methylene chloride layer is separated, dried with anhydrous sodium sulfate, evaporated to dryness and the residue recrystallized from acetone and Skellysolve B hexanes to give 6α-methyl-9α-fluoro-11β,16α,17α,21-tetrahydroxy-4-pregnene-3,20-dione 16,21-diacetate.

*Preparation 10.* — 6α-methyl-9α-fluoro-11β,16α,17α,21-tetrahydroxy-4-pregnene-3,20-dione (6α-methyl-9α-fluoro-16α-hydroxyhydrocortisone): A solution is prepared containing 0.5 gm. of 6α-methyl-9α-fluoro-11β,16α,17α,21-tetrahydroxy-4-pregnene-3,20-dione 16,21-diacetate, 100 mg. of potassium hydroxide in 10 ml. of methanol containing 1 ml. of water. This mixture is allowed to stand in a nitrogen atmosphere for a period of 6 hours and is then poured into 50 ml. of ice water and neutralized with dilute hydrochloric acid. The aqueous mixture is refrigerated at about 5° C. for two hours and then filtered. The precipitate is washed with water and twice recrystallized from acetone-Skellysolve B hexanes to give 6α,-methyl-9α-fluoro - 11β,16α,17α,21 - tetrahydroxy - 4 - pregnene-3,20-dione.

*Preparation 11.* — 6α - methyl-9α-fluoro-11β,16α,17α,21-tetrahydroxy-1,4-pregnadiene-3,20-dione (1-dehydro-6α-methyl - 9α - fluoro - 16α-hydroxyhydrocortisone): Three 100-ml. portions of a medium, in 250-ml. Erlenmeyer flasks, containing 1% glucose, 2% corn steep liquor (60% solids) and tap water, are adjusted to pH 4.9. This medium is sterilized for 45 minutes at 15 p.s.i. and inoculated with a 1–2 day growth of *Septomyxa affinis*, A.T.C.C. 6737. The Erlenmeyer flask is shaken at room temperature (26–28° C.) for a period of 3 days. At the end of this period the combined 300-ml. volume is added as an inoculum to 5 liters of the same glucose-corn steep liquor medium containing in addition 5 ml. of an anti-foam compound (a mixture of lard oil and octadecanol). The fermenter is placed in the water bath, the temperature adjusted to 28° C. and the contents stirred (300 r.p.m.) and aerated (0.3 liter of air to 5 liters of beer per minute). After 20 hours of incubation, when a good growth has developed, 1 gm. of 6α-methyl-9α-fluoro-11β, 16α,17α,21-tetrahydroxy-4-pregnene-3,20-dione plus 0.5 gm. of 3-ketobisnor-4-cholen-22-al, dissolved in 16 ml. of dimethylformamide, is added. Incubation is continued at the same temperature and aeration rate for a period of 72 hours to a final pH of 8.3. The mycelium is filtered and extracted with three 200-ml. portions of methylene chloride. The extracts of the beer and acetone are combined, dried over anhydrous sodium sulfate, evaporated to dryness and the resulting residue recrystallized three times from acetone-Skellysolve B hexanes to give 6α-methyl - 9α - fluoro-11β,16α,17α,21-tetrahydroxy-1,4-pregnadiene-3,20-dione (1-dehydro-6α-methyl-9α-fluoro-16α-hydroxyhydrocortisone).

*Preparation 12.* — 1 - dehydro-6α-methyl-9α-fluoro-16α-hydroxyhydrocortisone 16,17-acetonide: A mixture is prepared containing 2 gm. of 1-dehydro-6α-methyl-9α-fluoro-16α-hydroxyhydrocortisone in 200 ml. of acetone. To this mixture is added 0.5 ml. of 72% perchloric acid, and the resulting mixture is stirred for 5 hours at room temperature (25 to 30° C.). After 5 hours the reaction mixture is concentrated under reduced pressure at 40° C. to about 50 ml. The reaction mixture is then cooled to about 20° C. and 100 ml. of water is added, whereupon a white solid separates which is isolated by filtration. The solid is washed several times on filter paper and recrystallized from ethyl alcohol to give 1-dehydro-6α-methyl-9α-fluoro-16α-hydroxyhydrocortisone 16,17-acetonide in crystalline form, M.P. 242–247° C.

*Preparation 13.* — 1 - dehydro-6α-methyl-9α-fluoro-16α-hydroxyhydrocortisone 16,17-acetonide 21-acetate: A solution of 100 mg. of 1-dehydro-6α-methyl-9α-fluoro-16α-hydroxyhydrocortisone 16,17-acetonide in 3 ml. of pyridine and 2 ml. of acetic anhydride is allowed to stand at room temperature (about 24 to 26° C.) for 20 hours. The mixture is poured into 20 ml. of ice water and the aqueous solution extracted 3 times with 20-ml. portions of methylene chloride. The methylene chloride fractions are dried over anhydrous sodium sulfate and evaporated to give a crystalline residue of 1-dehydro-6α-methyl-9α-fluoro-16α-hydroxyhydrocortisone 16,17-acetonide 21-acetate.

*Preparation 14.* — 1 - dehydro-6α-methyl-9α-fluoro-16α-hydroxyhydrocortisone 16,17-acetonide 21-propionate: In the same manner as in Preparation 13, reacting 1-dehydro - 6α - methyl-9α-fluoro-16α-hydroxyhydrocortisone 16,17-acetonide in pyridine solution with propionic anhydride yields 1 - dehydro-6α-methyl-9α-fluoro-16α-hydroxyhydrocortisone 16,17-acetonide 21-propionate.

*Preparation 15.* — 1 - dehydro-6α-methyl-9α-fluoro-16α-hydroxyhydrocortisone 16,17-acetonide 21-butyrate: In the same manner as in Preparation 13, reacting 1-dehydro - 6α-methyl-9α-fluoro-16α-hydroxyhydrocortisone 16,17-acetonide in pyridine solution with butyric anhydride yields 1-dehydro-6α-methyl-9α-fluoro-16α-hydroxyhydrocortisone 16,17-acetonide 21-butyrate.

*Preparation 16.*—1 - dehydro-6α-methyl-9α-fluoro-16α-hydroxyhydrocortisone 16,17-acetonide 21-valerate: In the same manner as in Preparation 13, reacting 1-dehydro - 6α-methyl-9α-fluoro-16α-hydroxyhydrocortisone 16,17-acetonide in pyridine solution with valeric anhydride yields 1 - dehydro-6α-methyl-9α-fluoro-16α-hydroxyhydrocortisone 16,17-acetonide 21-valerate.

*Preparation 17.*—1 - dehydro-6α-methyl-9α-fluoro-16α-hydroxyhydrocortisone 16,17-acetonide 21-hexanoate: In the same manner as in Preparation 13, reacting 1-dehydro-6α - methyl - 9α-fluoro-16α-hydroxyhydrocortisone 16,17-acetonide in pyridine solution with hexanoic anhydride yields 1-dehydro-6α-methyl-9α-fluoro-16α-hydroxyhydrocortisone 16,17-acetonide 21-hexanoate.

*Preparation 18.*—1 - dehydro-6α-methyl-9α-fluoro-16α-hydroxyhydrocortisone 16,17-acetonide 21-benzoate: In the same manner as in Preparation 13, reacting 1-dehydro - 6α-methyl-9α-fluoro-16α-hydroxyhydrocortisone 16,17-acetonide in pyridine solution with benzoic anhydride yields 1-dehydro-6α-methyl-9α-fluoro-16α-hydroxyhydrocortisone 16,17-acetonide 21-benzoate.

*Preparation 19.*—1 - dehydro-6α-methyl-9α-fluoro-16α-hydroxyhydrocortisone 16,17-acetonide 21-phenylacetate: In the same manner as in Preparation 13, reacting 1-dehydro - 6α - methyl-9α-fluoro-16α-hydroxyhydrocortisone 16,17-acetonide in pyridine solution with phenylacetic anhydride yields 1-dehydro-6α-methyl-9α-fluoro-16α-hydroxyhydrocortisone 16,17-acetonide 21-phenylacetate.

*Preparation 20.*—1 - dehydro-6α-methyl-9α-fluoro-16α-hydroxyhydrocortisone 16,17-acetonide 21-hemisuccinate: In the same manner as in Preparation 13, reacting 1-dehydro - 6α - methyl-9α-fluoro-16α-hydroxyhydrocortisone 16,17-acetonide in pyridine solution with succinic anhydride yields 1-dehydro-6α-methyl-9α-fluoro-16α-hydroxyhydrocortisone 16,17-acetonide 21-hemisuccinate.

*Preparation 21.*—1 - dehydro-6α-methyl-9α-fluoro-16α-hydroxyhydrocortisone 16,17-acetonide 21-hemi-(β,β-dimethylglutarate): In the same manner as in Preparation 13, reacting 1-dehydro-6α-methyl-9α-fluoro-16α-hydroxyhydrocortisone 16,17-acetonide in pyridine solution with β,β-dimethylglutaric anhydride yields 1-dehydro-6α-methyl - 9α-fluoro-16α-hydroxyhydrocortisone 16,17-acetonide 21-hemi-(β,β-dimethylglutarate).

*Preparation 22.*—1 - dehydro-6α-methyl-9α-fluoro-16α-hydroxyhydrocortisone 16,17-acetonide 21-hemisuccinate sodium salt: Sodium hydroxide solution (0.1 Normal) is slowly added, with stirring, to a solution of 0.5 gm. of 1 - dehydro - 6α-methyl-9α-fluoro-16α-hydroxyhydrocortisone 16,17-acetonide 21-hemisuccinate in 20 ml. of acetone to a pH of 7.5. During the addition of the sodium hydroxide solution 25 ml. of water is also added. The solution is concentrated at 26° C. under vacuum to remove the acetone. The resulting aqueous solution of 1-dehydro-6α - methyl - 9α-fluoro-16α-hydroxyhydrocortisone 16,17-acetonide 21-hemisuccinate sodium salt is filtered, freeze-dried and recrystallized to give essentially pure 1-dehydro-6α - methyl - 9α-fluoro-16α-hydroxyhydrocortisone 16,17-acetonide 21-hemisuccinate sodium salt.

*Preparation 23.*—1 - dehydro-6α-methyl-9α-fluoro-16α-hydroxyhydrocortisone 16,17-acetonide 21-hemi-(β,β-dimethylglutarate) sodium salt: Sodium hydroxide solution (0.1 Normal) is slowly added to a stirred solution of 0.5 gm. of 1-dehydro-6α-methyl-9α-fluoro-16α-hydroxyhydrocortisone 16,17-acetonide 21-hemi-(β,β-dimethylglutarate) in 25 ml. of acetone to a pH of 7.4. During the addition of the sodium hydroxide solution 25 ml. of water is also added. The solution is concentrated at 25° C. under reduced pressure to remove the acetone. The resulting aqueous solution is filtered, freeze-dried and recrystallized to give 1 - dehydro - 6α-methyl-9α-fluoro-16α-hydroxyhydrocortisone, 16,17-acetonide 21-hemi-(β,β-dimethylglutarate) sodium salt.

*Preparation 24.*—1 - dehydro-6α-methyl-9α-fluoro-16α-hydroxyhydrocortisone 16,17-acetonide 21-(2-fuorate):

A solution is prepared containing in 3 ml. of pyridine 100 mg. of 1-dehydro-6α-methyl-9α-fluoro-16α-hydroxy-hydrocortisone 16,17-acetonide and 2 ml. of 2-furoyl chloride. The mixture is allowed to stand for a period of 24 hours and is then poured into 10 ml. of ice water. The aqueous reaction mixture is then extracted with 3 portions of 10-ml. each of methylene chloride. The methylene chloride extracts are combined, dried over anhydrous sodium sulfate, evaporated and the residue recrystallized several times from ethanol to give essentially pure 1-dehydro-6α-methyl - 9α - fluoro-16α-hydroxyhydrocortisone 16,17-acetonide 21-(2-fuorate).

*Preparation 25.*—1 - dehydro-6α-methyl-9α-fluoro-16α-hydroxyhydrocortisone 16,17-acetonide 21-methanesulfonate: In the same manner as in Preparation 24, reacting 1 - dehydro - 6α-methyl-9α-fluoro-16α-hydroxyhydrocortisone 16,17-acetonide in pyridine solution with methanesulfonyl chloride gives 1-dehydro-6α-methyl-9α-fluoro-16α-hydroxyhydrocortisone 16,17-acetonide 21-methanesulfonate.

The following examples illustrate the best mode contemplated by the inventor for carrying out the invention, but such examples are not to be construed as limiting the scope thereof.

EXAMPLE 1

*Ointment.*—Five hundred pounds of an ointment containing 0.01% 1-dehydro-6α-methyl-9α-fluoro-16α-hydroxyhydrocortisone 16,17-acetonide is prepared from the following types and amounts of materials, the percentages being by weight:

| | |
|---|---|
| 4% Multiwax No. W–445* | 20 lbs. |
| 20% White mineral oil, U.S.P., viscosity 180 | 100 lbs. |
| 0.5% Cholesterol, U.S.P. | 2 lbs. 8 oz. |
| 0.02% Methylparaben, U.S.P. | 1 oz. 263 grs. |
| 0.18% n-Butyl-p-hydroxybenzoate | 14 oz. 175 grs. |
| 0.01% 1-dehydro-6α-methyl-9α-fluoro-16α - hydroxyhydrocortisone 16,17-acetonide | 350 grs. |
| White petrolatum, U.S.P., q.s. | 500 lbs. |

* High melting point wax from L. Sonneborn and Sons, Inc., New York City, N.Y.

The petrolatum and Multiwax are melted together and the mineral oil added. The mixture is heated to 190° F. and the cholesterol added. After cooling to 170° F., the paraben and hydroxybenzoate are introduced. The resulting mixture is strained and cooled to between 130 and 135° F. The 1-dehydro-6α-methyl-9α-fluoro-16α-hydroxyhydrocortisone 16,17-acetonide is added and mixed in thoroughly with a high-speed mixer. The whole is then passed through a mill and mixed in a high-speed mixer until the product is congealed. The product is then ready for potency assay and packaging.

The foregoing ointment can be employed in the treatment of allergic dermatoses and other inflammatory skin conditions, such as contact dermatitis, atopic dermatitis, neurodermatitis, anogenital pruritus, seborrheic dermatitis and the like. The ointment is rubbed gently into the affected area three times daily.

Substitution of 1 lb. of the sodium salt of 1-dehydro-6α - methyl - 9α-fluoro-16α-hydroxyhydrocortisone 16,17-acetonide 21-hemisuccinate, hemiglutarate, hemi-β,β-dimethylglutarate, or hemimaleate for the 1-dehydro-6α-methyl - 9α - fluoro-16α-hydroxyhydrocortisone 16,17-acetonide is productive of ointments exhibiting similar effectiveness when applied as indicated.

EXAMPLE 2

Following the procedure of Example 1 but including in the formulation 5 lbs. of novobiocin acid calcium is productive of an ointment having wide application.

EXAMPLE 3

Following the procedure of Example 1 but including in the formulation 15 lbs. of tetracycline hydrochloride is productive of an ointment having application in a variety of clinical conditions.

EXAMPLE 4

Following the procedure of Example 1 but including in the formulation 5 lbs. of bacitracin (50 units per mg.) is productive of an ointment having application in a variety of clinical conditions.

EXAMPLE 5

Following the procedure of Example 1 but including in the formulation 16 lbs. 8 oz. of nystation (3000 units per mg.) is productive of an ointment having application in a variety of clinical conditions.

EXAMPLE 6

Following the procedure of Example 1 but including in the formulation 4 oz. of polymyxin B sulfate (10,000 units per mg.) is productive of an ointment having application in a variety of clinical conditions.

EXAMPLE 7

Following the procedure of Example 1 but including in the formulation 2 lbs. 8 oz. of erythromyxin is productive of an ointment having application in a variety of clinical conditions.

EXAMPLE 8

Following the procedure of Example 1 but including in the formulation 3 lbs. 12 oz. of neomycin sulfate, 5 lbs. of bacitracin (50 units per mg.) and 4 oz. of polymyxin B sulfate (10,000 units per mg.) is productive of a combination ointment product having broad clinical application.

EXAMPLE 9

Following the procedure of Example 1 but including in the formulation 3 lbs. 12 oz. of neomycin sulfate and 2 lbs. 8 oz. of erythromycin is productive of an ointment having wide application.

EXAMPLE 10

Following the procedure of Example 1 but including in the formulation 3 lbs. 12 oz. of neomycin sulfate and 15 lbs. of tetracycline hydrochloride is productive of an ointment having application in a variety of clinical conditions.

EXAMPLE 11

*Ointment, ophthalmic.*—Ten kilograms of an ophthalmic ointment containing 0.005% 1-dehydro-6α-methyl-9α-fluoro-16α-hydroxyhydrocortisone 16,17-acetonide is prepared from the following types and amounts of materials:

| | Gm. |
|---|---|
| 25% Light mineral oil, U.S.P. | 2500 |
| 20% Wool fat, U.S.P. | 2000 |
| 0.005% 1-dehydro - 6α - methyl-9α-fluoro-16α-hydroxyhydrocortisone 16,17-acetonide | 0.5 |
| White petrolatum, U.S.P., q.s. | 10,000 |

The 1-dehydro-6α-methyl-9α-fluoro-16α-hydroxyhydrocortisone 16,17-acetonide is ground with the mineral oil in a colloid mill. The wool fat and petrolatum are melted, strained, and the temperature adjusted to 45 to 50° C. The mineral oil slurry is added with thorough stirring which is continued until the temperature drops to about 35° C. The product is then ready for potency assay and filling into ophthalmic tubes.

The ointment is placed in the conjunctival sac three times daily for treatment of inflammatory conditions of the eye, such as allergic conjunctivitis.

EXAMPLE 12

Following exactly the procedure of Example 11 above but including in the formulation 66.7 gms. of neomycin sulfate is productive of an ophthalmic ointment having wide application in treatment of inflammatory conditions of the eye originating with or complicated by bacterial infections.

Similarly, substitution of 30 gms. of tetracycline hydrochloride for the neomycin is productive of an ophthalmic ointment advantageously used where the bacterial infection is believed susceptible to tetracycline hydrochloride.

EXAMPLE 13

*Cream.*—A cream containing 0.05% 1-dehydro-6α-methyl-9α-fluoro-16α-hydroxyhydrocortisone 16,17-acetonide 21-acetate and neomycin is prepared in a 1000 gm. lot from the following types and amounts of materials:

| | Gm. |
|---|---|
| 15% Tegacid Regular * | 150 |
| 10% Spermaceti, U.S.P. | 100 |
| 5% Propylene glycol, U.S.P. | 50 |
| 0.5% Polysorbate 80, U.S.P. | 5 |
| 0.1% Methylparaben, U.S.P. | 1 |
| 0.5% Neomycin sulfate | 5 |
| 0.05% 1-dehydro-6α-methyl-9α-fluoro-16α-hydroxyhydrocortisone 16,17-acetonide 21-acetate, micronized | 0.5 |
| Deionized water, q.s. | 1000 |

* Self-emulsifying glyceryl monostearate from Goldschmidt Chemical Corporation, New York, N.Y.

The Tegacid and spermaceti are melted together at a temperature of 70 to 80° C. The methylparaben is dissolved in about 500 gms. of water, and the propylene glycol, polysorbate 80, 1-dehydro-6α-methyl-9α-fluoro-16α-hydroxyhydrocortisone 16,17-acetonide 21-acetate and neomycin sulfate are added in turn, maintaining a temperature of 75 to 80° C. The methylparaben mixture is added slowly to the Tegacid and spermaceti melt, with constant stirring. The addition is continued for at least 30 minutes with additional stirring until the temperature has dropped to 40 to 45° C. The pH of the final cream is adjusted to 3.5 by incorporating, with stirring, 2.5 gms. of citric acid, U.S.P. and 0.2 gm. of dibasic sodium phosphate heptahydrate dissolved in about 50 gms. of water. Finally, sufficient water is added to bring the final weight to 1000 gms. and the preparation is stirred until homogeneous. The resulting product is then assayed and packaged for clinical use.

The above cream is applied once daily to the inflamed area.

EXAMPLE 14

*Lotion.*—Ten liters of a viscous lotion containing 0.025% 1-dehydro - 6α - methyl-9α-fluoro-16α-hydroxyhydrocortisone is prepared from the following types and amounts of materials:

| Per ml.: | Gm. |
|---|---|
| 50 mg. Propylene glycol, U.S.P. | 500 |
| 2 mg. Methylparaben, U.S.P. | 20 |
| 3 mg. n-Butyl-p-hydroxybenzoate | 30 |
| 20 mg. Polysorbate 80, U.S.P. | 200 |
| 80 mg. Glyceryl monostearate - diethyl - aminoethyl oleylamide phosphate (19:1) | 800 |
| 35 mg. Spermaceti, U.S.P. | 350 |
| 5.5 mg. Neomycin sulfate, U.S.P. | 55 |
| 0.25 mg. 1-dehydro - 6α - methyl-9α-fluoro-16α-hydroxyhydrocortisone 16,17 - acetonide, micronized | 2.5 |
| Perfume | 25 |
| Deionized water, q.s., 10 liters. | |

The methylparaben and n-butyl-p-hydroxybenzoate are dissolved in 4.5 liters of deionized water and the solution heated to 70 to 80° C. To this solution are added the propylene glycol, polysorbate 80, glyceryl monostearate-diethylaminoethyl oleylamide phosphate and spermaceti. The temperature of the mixture is maintained at 70 to 80° C. for 30 minutes and then allowed to cool to 35 to 45° C. The neomycin sulfate is dissolved in 3 liters of deionized water and added to the prior mixture. The 1-dehydro-6α-methyl-9α-fluoro - 16α - hydroxyhydrocortisone 16,17-acetonide is then introduced with vigorous mixing, water added to make 10 liters, and the resulting product strained and put through a homogenizer. This product is then ready for assay and packaging for clinical use.

The above lotion is applied twice daily to the inflamed area.

EXAMPLE 15

*Nasal spray.*—A suspension containing 0.005% 1-dehydro-6α-methyl-9α-fluoro-16α-hydroxyhydrocortisone 16,17-acetonide 21-acetate with neomycin and phenylephrine hydrochloride is prepared in a volume of 15 liters from the following types and amounts of materials:

| Per ml.: | Gm. |
|---|---|
| 5 mg. Polysorbate 80, U.S.P. | 75 |
| 1 mg. Sodium chloride, U.S.P. | 15 |
| 4.5 mg. Sodium citrate, U.S.P. | 67.5 |
| 0.23 mg. Myristyl gamma picolinium chloride | 3.5 |
| 14.3 mg. Glyceryl monostearate | 214 |
| 0.73 mg. Diethylaminoethyl oleylamide phosphate | 11 |
| 10 mg. Spermaceti, U.S.P. | 150 |
| 10 mg. Propylene glycol, U.S.P. | 150 |
| 6.4 mg. Neomycin sulfate powder | 96 |
| 2.5 mg. Phenylephrine hydrochloride, U.S.P. | 37.5 |
| 0.5 mg. Sorbic acid | 7.5 |
| 0.05 mg. 1-dehydro-6α-methyl-9α-fluoro-16α-hydroxyhydrocortisone 16,17-acetonide 21-acetate, micronized | 0.75 |
| Deionized water, q.s., 15 l. | |

Twelve liters of deionized water is heated in a suitable container to 70 to 75° C. Sodium chloride, sodium citrate, myristyl gamma picolinium chloride and sorbic acid are dissolved therein. Polysorbate 80 and propylene glycol are added and the 1-dehydro-6α-methyl-9α-fluoro-16α-hydroxyhydrocortisone 16,17-acetonide 21-acetate thoroughly dispersed in the resulting mixture. Glyceryl monostearate, diethylaminoethyl oleylamide phosphate and spermaceti are then introduced. While stirring constantly, the temperature is maintained at 75° C. for about 30 minutes and then cooled to room temperature. The neomycin sulfate and phenylephrine are then dissolved in the cooled mixture. Deionized water is added to bring the volume to 15 liters, and the resulting product is thoroughly stirred. The product is then ready for assay and packaging for clinical use as a nasal spray.

The foregoing spray is administered three times daily for treatment of nasal inflammation conditions such as allergic rhinitis.

Substitution of the sodium salt of 1-dehydro-6α-methyl-9α-fluoro-16α-hydroxyhydrocortisone 16,17-acetonide 21-hemisuccinate for the 1-dehydro-6α-methyl-9α-fluoro-16α-hydroxyhydrocortisone 16,17-acetonide 21-acetate above gives a similarly effective product.

EXAMPLE 16

*Drops.*—A sterile suspension containing 0.001% 1-dehydro-6α-methyl-9α-fluoro-16α-hydroxyhydrocortisone 16,17-acetonide 21-acetate from the following types and amounts of materials:

Per ml.
| 10 mg. 2-Hydroxy-3-methylaminopropyl (propylamino)-benzoate hydrochloride | gm | 1 |
|---|---|---|
| 6 mg. Neomycin sulfate | do | 0.6 |
| 4.5 mg. Sodium citrate, U.S.P. | do | 0.45 |
| 150 mg. Polyethylene glycol | do | 15 |
| 0.2 mg. Myristyl gamma picolinium | do | 0.02 |
| 1 mg. Polyvinylpyrrolidone | mg | 0.1 |
| 0.01 mg. 1-dehydro-6α-methyl - 9α - fluorohydroxyhydrocortisone 16,17-acetonide 21-acetate, sterile, micronized | do | 1 |
| Deionized water, q.s. | ml | 100 |

The foregoing formulation produces a suspension which is stable, readily resuspendable and does not cake. On mixing, sterilizing and suspending, the product is ready for assay and sterile packaging.

The suspension is useful for treatment of eye and ear infections characterized by inflammation. One drop is administered three times daily to the eye or external ear canal.

EXAMPLE 17

*Suppository.*—A suppository containing 0.05% 1-dehydro-6α-methyl-9α-fluoro-16α - hydroxyhydrocortisone 16,17-acetonide 21-acetate with neomycin, phenylephrine hydrochloride and ethylaminobenzoate is prepared from the following types and proportions of materials:

| | Parts |
|---|---|
| Polyethylene glycol 6000 | 750 |
| Polyoxyethylene sorbitan monostearate | 300 |
| Spermaceti | 330 |
| Polyethylene glycol 400 | 321 |
| Polyoxyethylene palmitate | 150 |
| Sodium sulfate | 900 |
| Coloring powder | 28 |
| Starch, bolted | 120 |
| Phenylephrine hydrochloride | 6 |
| Ethylaminobenzoate | 75 |
| Neomycin sulfate | 18 |
| 1-dehydro-6α-methyl-9α-fluoro - 16α - hydroxyhydrocortisone 16,17-acetonide 21-acetate, micronized | 1.5 |

The polyethylene glycol 6000, polyoxyethylene sorbitan monostearate and spermaceti are melted together at 180 to 190° F. The coloring powder, starch, about 15% of the sodium sulfate and the four active ingredients are dispersed in the polyethylene glycol 400. The dispersion is added to the melted mixture. The balance of the sodium sulfate is added. The whole is stirred at 180 to 190° F. to insure smoothness. The completed mass is allowed to cool and is then poured into chilled containers which are stored approximately 24 hours under refrigeration prior to extrusion to form shaped suppositories weighing 3 gms. each. The product is then ready for assay and packaging.

The foregoing suppositories are given rectally twice daily in the treatment of rectal conditions involving inflammation and/or infection, such as localized proctitis.

EXAMPLE 18

*Aerosol.*—An aerosol containing approximately 0.1% 1-dehydro-6α-methyl-9α-fluoro-16α - hydroxyhydrocortisone 16,17-acetonide with phenylephrine hydrochloride is prepared from the following types and amounts of materials:

| Absolute alcohol | gm | 4.37 |
|---|---|---|
| Dichlorodifluoromethane | do | 1.43 |
| Dichlorotetrafluoroethane | do | 5.70 |
| Phenylephrine hydrochloride | mg | 45.29 |
| 1-dehydro-6α-methyl-9α-fluoro-16α - hydroxyhydrocortisone 16,17-acetonide | do | 12.0 |

The 1-dehydro-6α-methyl-9α-fluoro-16α-hydroxyhydrocortisone 16,17-acetonide and phenylephrine hydrochloride are dissolved in the absolute alcohol and the resulting solution filtered to remove particles and lint. This solution is chilled to about minus 30° C. To this is added the chilled mixture of dichlorodifluoromethane and dichlorotetrafluoroethane. Thirteen ml. plastic-coated amber bottles are cold filled with 11.5 gms. each of the resulting solution and capped with a metering valve. The resulting package, when inverted into an oral inhalation adapter and the valve opened, will deliver a metered dose containing 0.08 mg. of 1-dehydro-6α-methyl-9α-fluoro-16α-hydroxyhydrocortisone 16,17-acetonide and 0.3 mg. of phenylephrine hydrochloride. The product is then ready for assay and clinical use.

The aerosol is administered three times daily in treating allergic or asthmatic conditions of the respiratory tract system which are characterized by local inflammation.

EXAMPLE 19

*Powder inhaler.*—One kilogram of an aerosol inhalant powder for treating allergic or asthmatic conditions of the respiratory tract and containing 1-dehydro-6α-methyl-9α-fluoro-16α-hydroxyhydrocortisone 16,17-acetonide 21-acetate and isopropylarterenol hydrochloride is prepared from the following types and amounts of materials:

|  | Gm. |
|---|---|
| 0.25% Isopropylarterenol hydrochloride (crystalline), micronized | 2.5 |
| 0.05% 1-dehydro-6α-methyl-9α-fluoro-16α-hydroxyhydrocortisone 16,17-acetonide 21-acetate (crystalline), micronized | 0.5 |
| 0.50% Sorbitan trioleate ("Span 85") | 5.0 |
| 49.50% Dichlorodifluoromethane ("Freon 12") | 495.0 |
| 49.50% Trichloromonofluoromethane ("Freon 11") | 495.0 |

The finely divided isopropylarterenol and steroid are triturated well with the sorbitan trioleate and dispersed in the cooled liquid propellant mixture. This slurry is filled into a container fitted with a metering valve nozzle. On operating the valve, the powder will be dispersed in a stream of propellant which will vaporize, providing an aerosol of dry powder.

A single inhalation of the above powder three times daily is used in treatment of asthma.

Substitution of the alkali metal salts, such as the sodium salt, of 1-dehydro-6α-methyl-9α-fluoro-16α-hydroxyhydrocortisone 16,17-acetonide 21-hemisuccinate, hemiglutarate, hemi-β,β-dimethylglutarate, or hemimaleate for the 1-dehydro-6α-methyl-9α-fluoro-16α-hydroxyhydrocortisone 16,17-acetonide or 1-dehydro-6α-methyl-9α-fluoro-16α-hydroxyhydrocortisone 16,17-acetonide 21-acetate of Examples 2 through 19 is productive of topical preparations exhibiting similar effectiveness.

EXAMPLE 20

*Mastitis preparation.*—A lot of 500 lbs. of a veterinary preparation is made with the following ingredients:

| Each 10 gm. contains: | Total Content |
|---|---|
| 275 mg. Neomycin sulfate, micronized | 13 lbs. 8 oz. |
| 110,000 units Procaine penicillin G, sterile | 5 lbs. 8 oz. |
| 55,000 units Polymyxin B sulfate | 1,247,000 units |
| 10 mg. 1-dehydro-6α-methyl-9α-fluoro-16α-hydroxyhydrocortisone 16,17 acetonide | 150 lbs. |
| 30% White mineral oil | 8 oz. |
| 0.525% Chlorobutanol anhydrous | 2 lbs. 10 oz. |
| 0.5% Polysorbate 80 | 2 lbs. 8 oz. |
| 0.5% Sorbitan monooleate | 2 lbs. 8 oz. |
| 40% 2% Aluminum monostearate-sesame oil gel | 200 lbs. |
| White petrolatum, q.s. | 500 lbs. |

Suspend the neomycin sulfate, procaine penicillin, polymyxin B sulfate and 1-dehydro-6α-methyl-9α-fluoro-16α-hydroxyhydrocortisone 16,17-acetonide in 100 lbs. of white mineral oil and mix thoroughly. Mill through Fitzpatrick Mill (80 mesh screen). Wash the mill with 50 lbs. of white mineral oil and add. Stir slowly for at least one hour to dissipate entrapped air. Add the chlorobutanol, polysorbate 80 and sorbitan monooleate to 70 lbs. of the 2% aluminum monostearate-sesame oil gel and mix thoroughly with an air mixer until completely dissolved. Strain into the remainder of the 2% aluminum monostearate-sesame oil gel and mix. Melt the petrolatum and strain into the gel, with thorough mixing. Add the mineral oil-powder mixture and adjust the temperature to 120° F., while stirring. Continue stirring only until the temperature is reduced to 100° F. Allow to cool to room temperature before filling into 100-cc. vials or 10-cc. disposable syringes.

Administration by udder instillation in 10 gm. doses once daily affords effective therapy in the treatment of bovine mastitis.

Other antibiotics conventionally employed in the management of veterinary mastitis can be substituted for the neomycin, penicillin and polymyxin above. For example, such antibiotics as erythromycin, novobiocin sodium and dihydrostreptomycin sulfate, in amounts normally employed for such treatment, can be incorporated with the 1-dehydro-6α-methyl-9α-fluoro-16α-hydroxyhydrocortisone 16,17-acetonide. Alternatively, other antibacterials such as the sulfonamides, e.g., sulfisoxazole, and nitrofurazone and its derivatives can be used instead of the foregoing antibiotics.

It is to be understood that this invention is not to be limited to the exact details of practice or exact compounds or compositions shown and described, as obvious modifications and equivalents will be apparent to one skilled in the art; the invention is therefore to be limited only by the scope of the appended claims.

What is claimed is:

1. A topical composition comprising: from about 0.001% to about 0.5% of a member selected from the group consisting of 1-dehydro-6α-methyl-9α-fluoro-16α-hydroxyhydrocortisone 16,17-acetonide and physiologically acceptable 21-esters thereof, dispersed in a pharmaceutically acceptable carrier.

2. A topical composition comprising: from about 0.005 to about 0.1 1-dehydro-6α-methyl-9α-fluoro-16α-hydroxyhydrocortisone 16,17-acetonide, dispersed in a pharmaceuticaly acceptable carrier.

3. A topical composition comprising: from about 0.005% to about 0.1% 1-dehydro-6α-methyl-9α-fluoro-16α-hydroxyhydrocortisone 16,17-acetonide 21-acetate, dispersed in a pharmaceutically acceptable carrier.

4. An ointment comprising: from about 0.005% to about 0.1% 1-dehydro-6α-methyl-9α-fluoro-16α-hydroxyhydrocortisone 16,17-acetonide 21-acetate and a therapeutic amount of neomycin sulfate, dispersed in a pharmaceutically acceptable ointment base.

5. A nasal spray comprising: from about 0.005% to about 0.1% 1-dehydro-6α-methyl-9α-fluoro-16α-hydroxyhydrocortisone 16,17-acetonide 21-acetate and therapeutic amounts of neomycin sulfate and phenylephrine hydrochloride, dispersed in a pharmaceutically acceptable spray base.

6. A mastitis preparation comprising: from about 0.05% to about 0.5% 1-dehydro-6α-methyl-9α-fluoro-16α-hydroxyhydrocortisone 16,17-acetonide 21-acetate and therapeutic amounts of neomycin sulfate, procaine penicillin G and polymyxin B sulfate, dispersed in a pharmaceutically acceptable liquid oleaginous base.

7. A method for treating inflammatory conditions amenable to topical therapy which comprises: topically applying from about 0.001% to about 0.5% of a member selected from the group consisting of 1-dehydro-6α-methyl-9α-fluoro-16α-hydroxyhydrocortisone 16,17-acetonide and physiologically acceptable 21-esters thereof, dispersed in a pharmaceutically acceptable carrier.

8. A method for treating inflammatory conditions amenable to topical therapy which comprises: topically applying from about 0.005% to about 0.1% 1-dehydro-6α-methyl-9α-fluoro-16α-hydroxyhydrocortisone 16,17-acetonide, dispersed in a pharmaceutically acceptable carrier.

9. A method for treating inflammatory conditions amenable to topical therapy which comprises: topically applying from about 0.005% to about 0.1% 1-dehydro-6α - methyl - 9α -fluoro - 16α -hydroxyhydrocortisone 16,17-acetonide 21-acetate, dispersed in a pharmaceutically acceptable carrier.

10. A method for treating inflammatory conditions amenable to topical therapy which comprises: topically applying from about 0.005% to about 0.1% 1-dehydro-6α - methyl - 9α - fluoro - 16α - hydroxyhydrocortisone 16,17-acetonide 21-acetate and a therapeutic amount of neomycin sulfate, dispersed in a pharmaceutically acceptable ointment base.

11. A method for treating inflammatory conditions of the nasal membranes which comprises: administering intranasally from about 0.005% to about 0.1% 1-dehydro-6α-methyl-9α-fluoro-16α-hydroxyhydrocortisone 16,17-acetonide 21-acetate and therapeutic amounts of neomycin sulfate and phenylephrine hydrochloride, dispersed in a pharmaceutically acceptable spray base.

12. A method for treating bovine mastitis which comprises: instilling into the udders of affected cows from about 0.05% to about 0.5% 1-dehydro-6α-methyl-9α-fluoro - 16α -hydroxyhydrocortisone 16,17 - acetonide 21-acetate and therapeutic amounts of neomycin sulfate, procaine penicillin G and polymyxin B sulfate, dispersed in a pharmaceutically acceptable liquid oleaginous base.

References Cited in the file of this patent
UNITED STATES PATENTS

| | | |
|---|---|---|
| 2,801,202 | Poetsch | July 30, 1957 |
| 2,831,003 | Thomas | Apr. 15, 1958 |
| 2,864,838 | Lincoln et al. | Dec. 16, 1958 |
| 2,867,637 | Lincoln et al. | Jan. 6, 1959 |
| 2,867,638 | Lincoln et al. | Jan. 6, 1959 |
| 2,897,218 | Sebek et al. | July 28, 1959 |

OTHER REFERENCES

Fried et al.: J. Am. Chem. Soc., vol. 80, pp. 2338–2339, May 5, 1958.

Ringold et al.: J. Am. Chem. Soc., vol. 80, pp. 6464 and 6465, Dec. 5, 1958.

Mills et al.: J. Am. Chem. Soc., vol. 81, pp. 1264 and 1265.

The Pharmaceutical Journal, page 73, July 26, 1958.

Drug Trade News, 32:1, p. 20, July 14, 1957.